(12) United States Patent
Prichard et al.

(10) Patent No.: US 11,065,863 B2
(45) Date of Patent: *Jul. 20, 2021

(54) CEMENTED CARBIDE POWDERS FOR ADDITIVE MANUFACTURING

(71) Applicant: Kennametal Inc., Latrobe, PA (US)

(72) Inventors: Paul D. Prichard, Greensburg, PA (US); Gabriel B. Collins, Madison, AL (US)

(73) Assignee: KENNAMETAL INC., Latrobe, PA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/437,153

(22) Filed: Feb. 20, 2017

(65) Prior Publication Data

US 2018/0236687 A1    Aug. 23, 2018

(51) Int. Cl.

| | | |
|---|---|---|
| *B33Y 80/00* | (2015.01) | |
| *B33Y 10/00* | (2015.01) | |
| *B33Y 70/00* | (2020.01) | |
| *C04B 35/56* | (2006.01) | |
| *C22C 29/08* | (2006.01) | |
| *B22F 3/10* | (2006.01) | |
| *B22F 5/10* | (2006.01) | |
| *B22F 3/15* | (2006.01) | |
| *C22C 29/06* | (2006.01) | |
| *B22F 10/10* | (2021.01) | |

(52) U.S. Cl.
CPC .............. *B33Y 80/00* (2014.12); *B33Y 10/00* (2014.12); *B33Y 70/00* (2014.12); *C04B 35/5626* (2013.01); *C22C 29/08* (2013.01); *B22F 3/10* (2013.01); *B22F 3/15* (2013.01); *B22F 5/10* (2013.01); *B22F 10/10* (2021.01); *B22F 2998/10* (2013.01); *B22F 2999/00* (2013.01); *C04B 2235/405* (2013.01); *C04B 2235/528* (2013.01); *C04B 2235/5436* (2013.01); *C04B 2235/6026* (2013.01); *C04B 2235/77* (2013.01); *C04B 2235/96* (2013.01); *C04B 2235/9615* (2013.01); *C22C 29/06* (2013.01); *C22C 29/067* (2013.01)

(58) Field of Classification Search
CPC ............ B33Y 70/00; B33Y 80/00; B22F 3/15
USPC .......................................................... 419/14
See application file for complete search history.

(56) References Cited

U.S. PATENT DOCUMENTS

| | | | |
|---|---|---|---|
| 2,884,227 A | 4/1959 | Hjalsten | |
| 4,059,879 A | 11/1977 | Chmura et al. | |
| 4,925,490 A | 5/1990 | Nagai et al. | |
| 6,220,117 B1 | 4/2001 | Butcher | |
| 6,353,771 B1 | 3/2002 | Southland | |
| 7,776,256 B2 | 8/2010 | Smith et al. | |
| 7,832,456 B2 | 11/2010 | Calnan et al. | |
| 7,832,457 B2 | 11/2010 | Calnan et al. | |
| 8,007,714 B2 | 8/2011 | Mirchandani et al. | |
| 8,459,380 B2 | 6/2013 | Mirchandani et al. | |
| 9,393,674 B2 | 7/2016 | Keshavan | |
| 9,435,211 B2 | 9/2016 | Xu | |
| 2003/0000339 A1 | 1/2003 | Findeisen | |
| 2003/0034177 A1 | 2/2003 | Chitwood et al. | |
| 2004/0134309 A1 | 7/2004 | Liu | |
| 2007/0277651 A1 | 12/2007 | Calnan et al. | |
| 2010/0038147 A1* | 2/2010 | Lockstedt | B22F 1/0096 175/426 |
| 2010/0193254 A1 | 8/2010 | Lind et al. | |
| 2011/0030440 A1 | 2/2011 | Keane et al. | |
| 2012/0040183 A1* | 2/2012 | Kelkar | B22F 3/1035 428/367 |
| 2012/0151846 A1 | 6/2012 | Wan | |
| 2012/0292063 A1 | 11/2012 | Xu et al. | |
| 2013/0048271 A1 | 2/2013 | VanLue | |
| 2013/0068539 A1 | 3/2013 | Vempati et al. | |
| 2013/0303356 A1 | 11/2013 | Smith et al. | |
| 2013/0313403 A1 | 11/2013 | Atkins et al. | |
| 2013/0316149 A1 | 11/2013 | Atkins et al. | |
| 2013/0320598 A1 | 12/2013 | Atkins et al. | |
| 2013/0333950 A1 | 12/2013 | Atkins et al. | |
| 2014/0087210 A1 | 3/2014 | Keane et al. | |
| 2014/0298728 A1 | 10/2014 | Keshavan | |
| 2015/0129316 A1 | 5/2015 | Harrington et al. | |
| 2015/0283614 A1 | 10/2015 | Wu et al. | |
| 2015/0354284 A1 | 12/2015 | Griffo et al. | |
| 2016/0039006 A1 | 2/2016 | Amstutz et al. | |
| 2016/0053550 A1 | 2/2016 | Wilson et al. | |
| 2016/0067780 A1 | 3/2016 | Zediker | |
| 2016/0076342 A1 | 3/2016 | Silva | |

(Continued)

FOREIGN PATENT DOCUMENTS

| | | |
|---|---|---|
| CN | 106780724 | 5/2017 |
| EP | 0864661 A1 | 9/1998 |

(Continued)

OTHER PUBLICATIONS

Clyne, T.W. et al., An Introduction to Metal Matrix Composites, Cambridge Solid State Science Series, Cambridge University Press 1993, 4 pages.

(Continued)

*Primary Examiner* — Weiping Zhu

(74) *Attorney, Agent, or Firm* — Larry R. Meenan

(57) ABSTRACT

In one aspect, particle powder compositions are provided for article manufacture by various additive manufacturing techniques. A powder composition comprises a particle component comprising sintered cemented carbide particles having apparent density of at least 6 g/cm$^3$.

21 Claims, 3 Drawing Sheets

(56) References Cited

U.S. PATENT DOCUMENTS

| | | |
|---|---|---|
| 2016/0082667 A1 | 3/2016 | Donderici |
| 2016/0084083 A1 | 3/2016 | Hice et al. |
| 2016/0088870 A1 | 3/2016 | Langeland |
| 2016/0138343 A1 | 5/2016 | Collins et al. |
| 2016/0138362 A1 | 5/2016 | Dockweiler |
| 2016/0177637 A1 | 6/2016 | Fleckenstein et al. |
| 2016/0185009 A1 | 6/2016 | Keshavan et al. |
| 2016/0201425 A1 | 7/2016 | Walton et al. |
| 2016/0222798 A1 | 8/2016 | Snyder et al. |
| 2016/0258223 A1 | 9/2016 | Uhlenberg et al. |
| 2016/0258242 A1 | 9/2016 | Hayter et al. |
| 2016/0258298 A1 | 9/2016 | Channel et al. |
| 2016/0288200 A1 | 10/2016 | Xu et al. |
| 2016/0312567 A1 | 10/2016 | Murphree et al. |
| 2016/0325348 A1 | 11/2016 | Ownby et al. |
| 2016/0332236 A1 | 11/2016 | Stoyanov |
| 2016/0375493 A1 | 12/2016 | Stoyanov et al. |
| 2017/0037518 A1 | 2/2017 | Oxford et al. |
| 2017/0050241 A1 | 2/2017 | Thomas et al. |
| 2017/0072465 A1 | 3/2017 | Welch et al. |
| 2017/0072469 A1* | 3/2017 | Maderud ............ B22F 1/0048 |
| 2017/0087622 A1 | 3/2017 | Cook, III et al. |
| 2017/0100771 A1 | 4/2017 | Voglewede et al. |
| 2017/0101835 A1 | 4/2017 | Webster et al. |
| 2017/0101836 A1 | 4/2017 | Webster et al. |
| 2017/0107764 A1 | 4/2017 | Cook, III et al. |
| 2017/0173696 A1 | 6/2017 | Sheinman |
| 2017/0342779 A1 | 11/2017 | Cook, III |
| 2017/0369382 A1 | 12/2017 | Billotte Cabre et al. |
| 2018/0236687 A1 | 8/2018 | Prichard et al. |
| 2018/0250744 A1 | 9/2018 | Symeonidis et al. |
| 2019/0168299 A1 | 6/2019 | Prichard et al. |

FOREIGN PATENT DOCUMENTS

| | | | |
|---|---|---|---|
| EP | 2690196 A | 1/2014 | |
| EP | 2465960 A1 | 6/2016 | |
| EP | 3409801 A1 | 12/2018 | |
| JP | H1088311 A | 4/1998 | |
| JP | 2002356328 A | 12/2002 | |
| WO | WO2007127899 A2 | 11/2007 | |
| WO | WO2011008439 A2 | 1/2011 | |
| WO | WO2011149401 A1 | 12/2011 | |
| WO | 2015073081 A | 5/2015 | |
| WO | 2015162206 A2 | 10/2015 | |
| WO | WO-2015162206 A2 * | 10/2015 | ............ B22F 7/06 |
| WO | WO2016056934 | 4/2016 | |
| WO | WO2016076853 | 5/2016 | |
| WO | WO2016085452 | 6/2016 | |
| WO | WO2016094704 A1 | 6/2016 | |
| WO | WO2016112169 | 7/2016 | |
| WO | WO2016176221 | 11/2016 | |
| WO | WO2017011825 | 1/2017 | |
| WO | WO2017039619 | 3/2017 | |
| WO | WO2017069744 | 4/2017 | |

OTHER PUBLICATIONS

Hashe N G et al, "Characterization of WC-(W,V)C-Co made from pre-alloyed (W,V)C", International Journal of Refractory Metals and Hard Materials, Elsevier, Amsterdam, NL, vol. 27, No. 2, doi:10.1016/J.IJRMHM.2008.09.020, ISSN 0263-4368, (Mar. 1, 2009), pp. 229-233, (Nov. 7, 2008), XP025937878 14, 17-20; p. 229, col. L, line 5; paragraph 1, table 3.

Kernan et al, "Three-dimensional printing of tungsten carbide-10wt% cobalt using a cobalt oxide precursor", International Journal of Refractory Metals and Hard Materials, Elsevier, Amsterdam, NL, (Jan. 1, 2007), vol. 25, No. 1, doi:10.1016/J.IJRMHM.2006.02.002, ISSN 0263-4368, pp. 82-94, XP005719849 [A] 1-14, 17-20, paragraphs [0001], [0003], [0004].

Wang et al., Direct Selective Laser Sintering of Hard Metal Powders.

Laoui, T. et al., Influence of powder parameters on selective laser sintering of tungsten carbide.

Kelley, III, Andrew, Tungsten Carbide-Cobalt by Three Dimensional Printing.

May 31, 2018 International Search Report Transmitted.

Apr. 4, 2018 Final Office Action 2.

Nov. 13, 2017 Office action (3 months) 2.

Apr. 4, 2017 Final Office Action.

Nov. 28, 2016 Office action (3 months) 1.

Aug. 13, 2019 Non-Final OA.

Wu et al., "Minimum Compliance Topology Optimization of Shell-Infill Composites for Additive Manufacturing", Computer Methods in Applied Mechanics and Engineering, 2017.

Kruth et al., "Consolidation phenomena in laser and powder-bed based layered manufacturing", CIRP Annals-Manufacturing Technology, 56 (2007), p. 730-759.

Clausen et al., "Exploiting Additive Manufacturing Infill in Topology Optimization for Improved Buckling Load", Engineering, 2 (2016), p. 250-257.

Belter et al., "Strengthening of 3D Printed Fused Deposition Manufactured Parts Using the Fill Compositing Technique", PLOS One, 2015.

Jan. 16, 2020 Foreign OA.

Dec. 24, 2019 Exam Notice.

Yun Bai et al., Effect of Particle Size Distribution on Powder Packing and Sintering in BinderJetting Additive Manufacturing of Metals. Journal of Manufacturing Science and Engineering,Jan. 6, 2017, vol. 139.

Apr. 1, 2020 Search Report.

Mar. 17, 2020 Non-Final OA.

Feb. 27, 2020 Advisory Action Received.

Feb. 21, 2020 Non-Final OA.

Dec. 20, 2019 Final OA.

Das et al., Producing Metal Parts with Selective Laser Sintering/Hot Isostatic Pressing, JOM, 50 (12) (1998), pp. 17-20.

May 13, 2020 Office Action.

Nag et al. Fundamentals of Medical Implant Materials, ASM Handbook, 2012, pp. 6-17, vol. 23, ASM International.

Murr et al. Fabricating Functional Ti-Alloy Biomedical Implants by Additive Manufacturing Using Electron Beam Melting, Journal of Biotechnology & Biomaterials, 2012, pp. 1-11, vol. 2, Issue 3, OMICS International.

United States Patent and Trademark Office. Non-Final Office Action for U.S. Appl. No. 15/831,779, dated Aug. 5, 2020, pp. 1-19.

United States Patent and Trademark Office. Non-Final Office Action for U.S. Appl. No. 16/196,846, dated Jul. 21, 2020, pp. 1-16.

Jasty et al. Comparison of Bone Ingrowth into Cobalt Chrome Sphere and Titanium Fiber Mesh Porous Coated Cementless Canine Acetabular Components, Journal of Biomedical Materials Research, 1993, pp. 639-644, vol. 27, John Wiley & Sons, Inc.

* cited by examiner

CEMENTED CARBIDE POWDERS FOR ADDITIVE MANUFACTURING

FIELD

The present invention relates to cemented carbide powders and, in particular, to cemented carbide powders for use with one or more additive manufacturing techniques.

BACKGROUND

Additive manufacturing generally encompasses processes in which digital 3-dimensional (3D) design data is employed to fabricate an article or component in layers by material deposition and processing. Various techniques have been developed falling under the umbrella of additive manufacturing. Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of mold lubricants and coolant. Most importantly, additive manufacturing enables significant freedom in article design. Articles having highly complex shapes can be produced without significant expense allowing the development and evaluation of a series of article designs prior to final design selection.

SUMMARY

Cemented carbide powder compositions are provided for use in the production of various articles by one or more additive manufacturing techniques. Briefly, a powder composition described herein comprises a particle component, the particle component comprising sintered cemented carbide particles having apparent density of at least 6 g/cm$^3$. In some embodiments, the sintered cemented carbide particles have apparent density of at least 7 g/cm$^3$. Moreover, sintered cemented carbide particles of the powder composition can have an average individual particle density of at least 80 percent theoretical density.

In another aspect, methods of manufacturing articles are described herein. A method of article manufacturing comprises providing a powder composition including a particle component, the particle component comprising sintered cemented carbide particles having apparent density of at least 6 g/cm$^3$. The powder composition is formed into a green article by one or more additive manufacturing techniques, and the green article is sintered to provide a sintered article. In some embodiments, the sintered article is greater than 95 percent theoretical density. Additive manufacturing techniques contemplated herein include, but are not limited to, binder jetting, material jetting, laser powder bed, electron beam powder bed and directed energy deposition as described in ASTM F-42.

These and other embodiments are described further in the following detailed description.

DETAILED DESCRIPTION

Figure 1A:
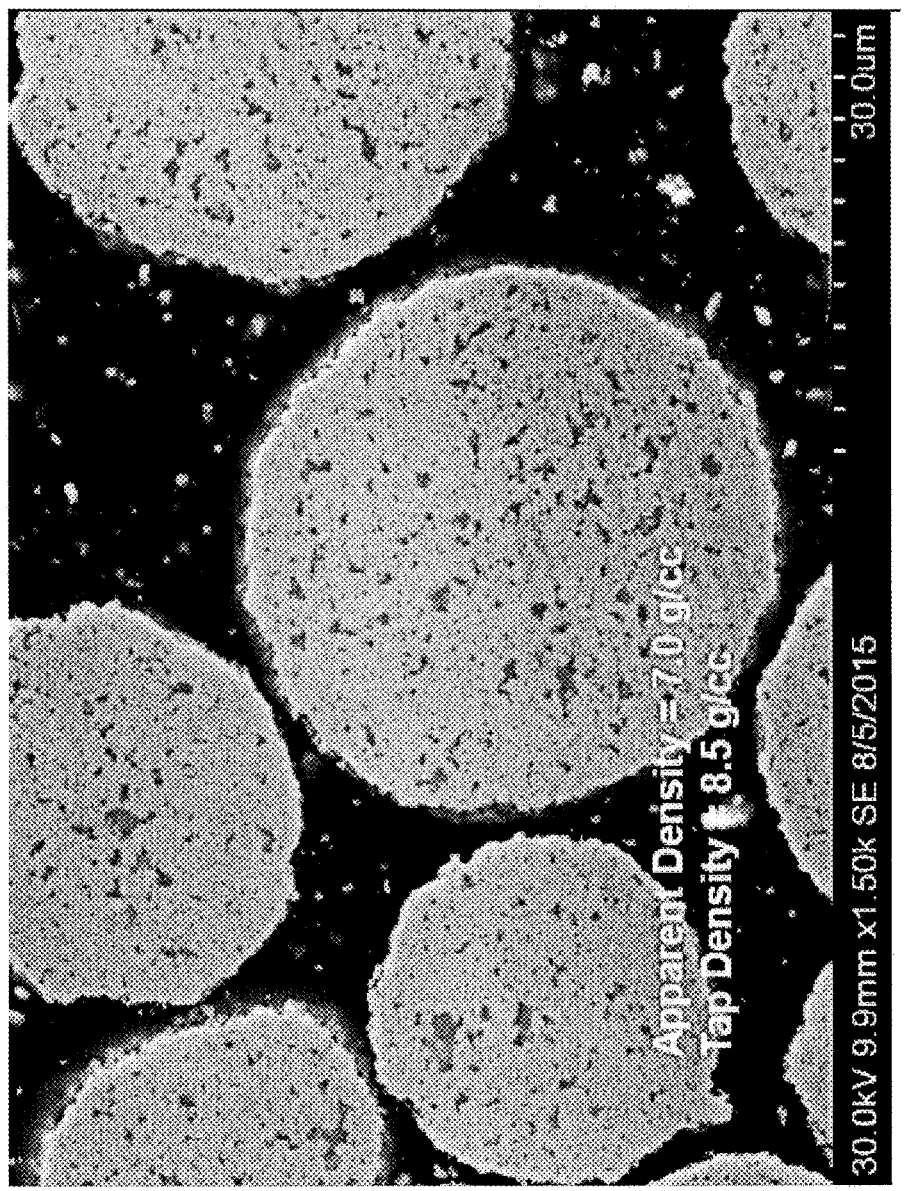
FIG. 1A is a scanning electron microscopy image (SEM) image of sintered cemented carbide particles according to some embodiments described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, powder compositions are provided for article manufacture by various additive manufacturing techniques. A powder composition comprises a particle component comprising sintered cemented carbide particles having apparent density of at least 6 g/cm$^3$. As known to one of skill in the art, apparent density is the mass of a unit volume of powder or particles in the loose condition, usually expressed in g/cm$^3$. In some embodiments, sintered cemented carbide particles of the particle component have apparent density of at least 7 g/cm$^3$. Apparent density of sintered cemented carbide particles of powder compositions described herein can also have values selected from Table I.

TABLE I

| Apparent Density of Sintered Cemented Carbide Particles |
|---|
| ≥6.5 g/cm$^3$ |
| ≥7.5 g/cm$^3$ |
| ≥8 g/cm$^3$ |
| ≥9 g/cm$^3$ |
| 6-11 g/cm$^3$ |
| 7-11 g/cm$^3$ |
| 8-11 g/cm$^3$ |

Apparent density of sintered cemented particles can be determined according to ASTM B212 Standard Test Method for Apparent Density of Free-Flowing Metal Powders using the Hall Flowmeter Funnel.

In addition to apparent density, sintered cemented carbide particles of powder compositions described herein can have tap density of at least 7 g/cm$^3$. In some embodiments, sintered cemented carbide particles exhibit tap density having a value selected from Table II.

TABLE II

| Tap Density of Sintered Cemented Carbide Particles |
|---|
| ≥7.5 g/cm$^3$ |
| ≥8 g/cm$^3$ |
| ≥8.5 g/cm$^3$ |
| ≥9.5 g/cm$^3$ |
| 7-12 g/cm$^3$ |
| 8-12 g/cm$^3$ |
| 9-12 g/cm$^3$ |

Tap density of sintered cemented carbide particles can be determined according to ASTM B527 Standard Test Method for Tap Density of Metal Powders and Compounds. In some embodiments, the ratio of tap density to apparent density (Hausner ratio) of sintered cemented carbide particles is 1.05 to 1.25. Hausner ratio of sintered cemented carbide particles, in some embodiments is 1.1 to less than 1.25.

In addition to apparent density and tap density, sintered cemented carbide particles described herein can have an average individual particle density of at least 80 percent theoretical density. In some embodiments, average individual particle density of the sintered cemented carbide particles is at least 90 percent or at least 95 percent theoretical density. Sintered cemented carbide particles can exhibit an average individual particle density of 80 to 95 percent theoretical density, in some embodiments. In further embodiments, sintered cemented carbide particles can exhibit an average individual particle density of 90 to 98 percent theoretical density.

As described further herein, the foregoing apparent densities, tap densities and individual particle densities can be achieved through one or several sintering processes administered to the particles. The sintering processes, in some embodiments, do not employ sintering inhibitor(s) to mitigate particle sticking or adhesion. Sintered cemented carbide particle properties described herein can be achieved in the absence of sintering inhibitor(s). In some embodiments, sintered cemented carbide particles are prepared by sintering a grade powder composition at temperatures of 1100° C. to 1400° C. for 0.5 to 2 hours to provide a sintered compact. The sintered compact is subsequently milled to provide individual sintered cemented carbide particles. Depending on particle morphology and density, the sintered cemented carbide particles can be further heat treated for further densification. Further heat treatment can include plasma densification, such as plasma spheroidization using an RF plasma torch or DC plasma torch. Alternatively, the sintered cemented carbide particles can be re-sintered forming a second compact. The second compact is milled to provide the sintered cemented carbide particles. Further densification treatments can be administered any desired number of times to provide sintered cemented carbide particles desired apparent densities, tap densities and/or individual particle densities. Sintering times and temperatures can be selected according to several considerations including, but not limited to, binder content of the cemented carbide particles, desired sintered particle density and sintering stage. In some embodiments, early sintering stages are conducted at lower temperatures and/or shorter times to facilitate milling the sintered compact. For example, an initial or early stage sintering process may be administered at temperatures below binder liquefaction. Late stage or final sintering processes may achieve higher temperatures, such as temperatures at which liquid phase sintering takes place.

Figure 1B:
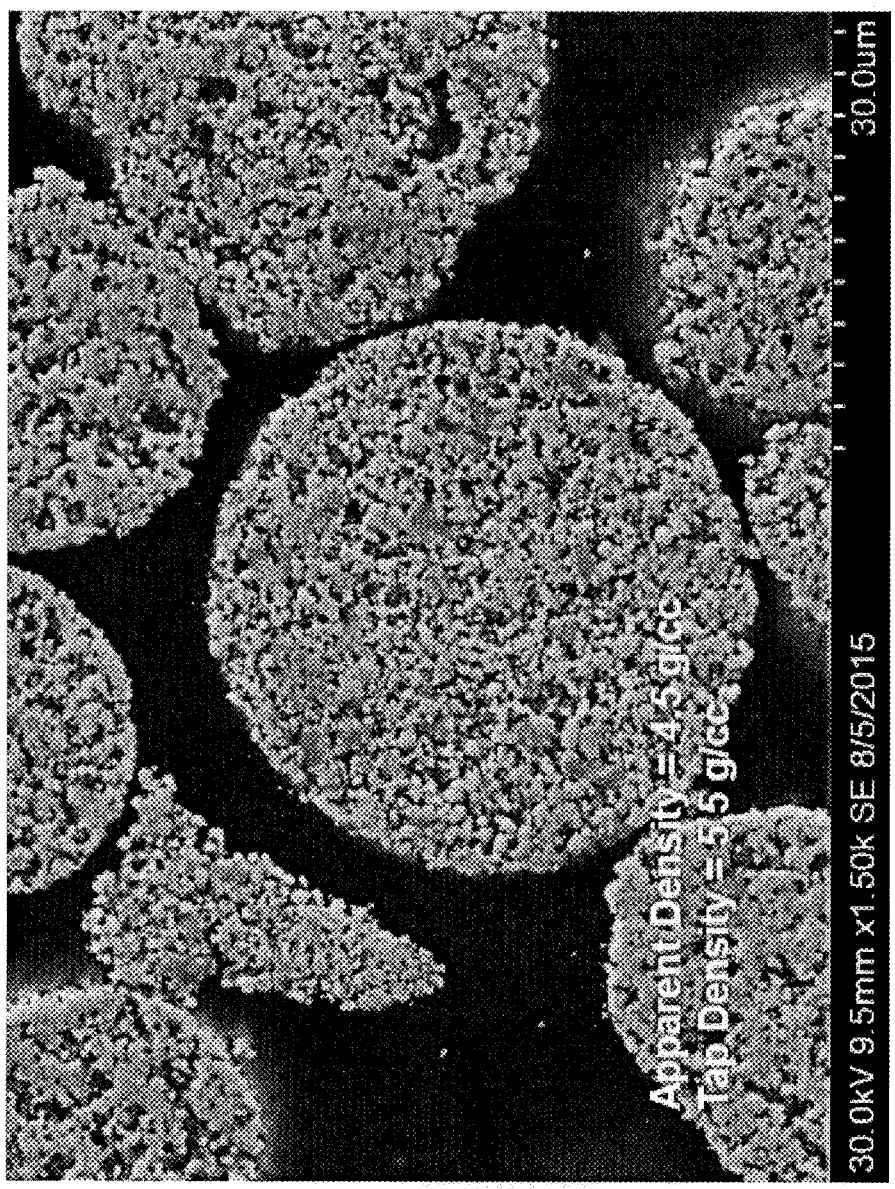
FIG. 1B is an SEM image of comparative sintered cemented carbide particles.

FIG. 1A is an SEM image of sintered cemented carbide particles according to some embodiments described herein. Two sintering processes have been administered to the cemented carbide particles resulting in an apparent density of 7 g/cm$^3$ and tap density of 8.5 g/cm$^3$. For comparative purposes, FIG. 1B is an SEM image of sintered cemented carbide particles having apparent density of 4.5 g/cm$^3$ and tap density of 5.5 g/cm$^3$. As illustrated in FIG. 1B, the sintered cemented carbide particles exhibit susbstantially higher porosity, thereby inducing low individual particle density.

Sintered cemented carbide particles can generally have an average size of 1 µm to 100 µm. In some embodiments, sintered cemented carbide particles have an average size selected from Table III.

TABLE III

| Average Sintered Cemented Carbide Particle Size (µm) |
|---|
| 5-90 |
| 5-50 |
| 10-75 |
| 10-50 |
| 5-40 |
| 20-40 |
| 0.5-2 |
| 1-5 |
| 1-10 |

Sintered cemented carbide particles can exhibit a Gaussian particle size distribution, in some embodiments. In other embodiments, sintered cemented carbide particles can have a polydisperse, bimodal or multi-modal particle size distribution. In further embodiments, sintered cemented carbide particles can be monodisperse or substantially monodisperse. In being substantially monodisperse, the cemented carbide particles are within ±10 percent or ±5 of the average particle size. In some embodiments, sintered cemented carbide particles are spherical or substantially spherical in shape. Alternatively, sintered cemented carbide particles can be a mixture of irregularly shaped particles with spherical or substantially spherical particles. Sintered cemented carbide particles comprise one or more metal carbides selected from the group consisting of Group IVB metal carbides, Group VB metal carbides and Group VIB metal carbides. In some embodiments, tungsten carbide is the sole metal carbide of the sintered particles. In other embodiments, one or more Group IVB, Group VB and/or Group VIB metal carbides are combined with tungsten carbide to provide the sintered particles. For example, chromium carbide, titanium carbide, vanadium carbide, tantalum carbide, niobium carbide, zirconium carbide and/or hafnium carbide and/or solid solutions thereof can be combined with tungsten carbide in sintered particle production. Tungsten carbide can generally be present in the sintered particles in an amount of at least about 80 or 85 weight percent. In some embodiments, Group IVB, VB and/or VIB metal carbides other than tungsten carbide are present in the sintered particles in an amount of 0.1 to 5 weight percent.

In some embodiments, the sintered cemented carbide particles do not comprise double metal carbides or lower metal carbides. Double and/or lower metal carbides include, but are not limited to, eta phase ($Co_3W_3C$ or $Co_6W_6C$), $W_2C$ and/or $W_3C$. Moreover, sintered articles formed from sintered cemented carbide particles, in some embodiments, also do not comprise non-stoichiometric metal carbides. Additionally, the sintered cemented carbide particles can exhibit uniform or substantially uniform microstructure.

Sintered cemented carbide particles comprise metallic binder. Metallic binder of sintered cemented carbide particles can be selected from the group consisting of cobalt, nickel and iron and alloys thereof. In some embodiments, metallic binder is present in the sintered cemented carbide particles in an amount of 0.1 to 35 weight percent. Metallic binder can also be present in the sintered cemented carbide particles in an amount selected from Table IV.

TABLE IV

| Metallic Binder Content (wt. %) |
|---|
| 0.1-20 |
| 0.1-10 |
| 0.5-15 |

TABLE IV-continued

| Metallic Binder Content (wt. %) |
| --- |
| 1-10 |
| 3-20 |
| 5-15 |
| 12-15 |
| 10-35 |
| 15-35 |
| 15-25 |

Metallic binder of the sintered cemented carbide particles can also comprise one or more additives, such as noble metal additives. In some embodiments, the metallic binder can comprise an additive selected from the group consisting of platinum, palladium, rhenium, rhodium and ruthenium and alloys thereof. In other embodiments, an additive to the metallic binder can comprise molybdenum, silicon or combinations thereof. Additive can be present in the metallic binder in any amount not inconsistent with the objectives of the present invention. For example, additive(s) can be present in the metallic binder in an amount of 0.1 to 10 weight percent of the sintered cemented carbide particles.

In another aspect, methods of manufacturing articles are described herein. A method of article manufacturing comprises providing a powder composition comprising a particle component, the particle component comprising sintered cemented carbide particles having apparent density of at least 6 g/cm$^3$. The powder composition is formed into a green article by one or more additive manufacturing techniques, and the green article is sintered to provide a sintered article. In some embodiments, the sintered article is greater than 95 percent theoretical density. Sintered cemented carbide particles of the particle component can have any composition and properties discussed herein. For example, sintered cemented carbide particles can have any combination of properties selected from Tables I-IV herein. Moreover, the sintered cemented carbide particles can comprise one or more metal carbides selected from the group consisting of Group IVB metal carbides, Group VB metal carbides and Group VIB metal carbides, as described above.

As described herein, the sintered cemented carbide particles are formed into a green article by one or more additive manufacturing techniques. Any additive manufacturing technique operable to form the sintered cemented carbide powder into a green article can be employed. In some embodiments, additive manufacturing techniques employing a powder bed are used to construct green articles formed of sintered cemented carbide powder. For example, binder jetting can provide a green article formed of sintered cemented carbide powder. In the binder jetting process, an electronic file detailing the design parameters of the green part is provided. The binder jetting apparatus spreads a layer of sintered cemented carbide powder in a build box. A printhead moves over the powder layer depositing liquid binder according to design parameters for that layer. The layer is dried, and the build box is lowered. A new layer of sintered cemented carbide powder is spread, and the process is repeated until the green article is completed. In some embodiments, other 3D printing apparatus can be used to construct the green article from the sintered cemented carbide powder in conjunction with organic binder.

Any organic binder not inconsistent with the objectives of the present invention can be employed in formation of the green article by one or more additive manufacturing techniques. In some embodiments, organic binder comprises one or more polymeric materials, such as polyvinylpyrrolidone (PVP), polyethylene glycol (PEG) or mixtures thereof. Organic binder, in some embodiments, is curable which can enhance strength of the green article. The green article, for example, can exhibit compressive strength of at least 10 MPa. In some embodiments, compressive strength of the green article is in the range of 10-20 MPa. Compressive strength of the green article is determined according to ASTM E9 Standard Test Method of Compression Testing of Metallic Materials at Room Temperature.

Green articles formed from powder compositions described herein can be sintered under conditions and for time periods to provide sintered articles having the desired density. The green article can be vacuum sintered or sintered under a hydrogen or argon atmosphere at temperatures of 1300° C. to 1560° C. Moreover, sintering times can generally range from 10 minutes to 5 hours. In some embodiments, hot isostatic pressing (HIP) is added to the sintering process. Hot isostatic pressing can be administered as a post-sinter operation or during vacuum sintering. Hot isostatic pressing can be administered for up to 2 hours at pressures of 1 MPa to 300 MPa and temperatures of 1300° C. to 1560° C. Sintered articles described herein can exhibit densities greater than 98% theoretical full density. Density of a sintered article can be at least 99% theoretical full density. Moreover, microstructure of the sintered articles can be uniform, in some embodiments. Non-stoichiometric metal carbides, such as eta phase, W$_2$C and/or W$_3$C, may also be absent in the sintered articles. Alternatively, sintered cemented carbide articles can comprise non-stoichiometric metal carbide(s) in minor amounts (generally <5 wt. % or <1 wt. %). Moreover, a sintered article described herein can have an average grain size less than 100 µm. In some embodiments, for example, a sintered article has an average grain size of 1-50 µm or 10-40 µm.

Sintered articles formed according to methods described herein can have transverse rupture strength of at least 2 GPa or at least 2.5 GPa. In some embodiments, sintered articles exhibit transverse rupture strength having a value selected from Table V.

TABLE V

| Sintered Article Transverse Rupture Strength (GPa) |
| --- |
| 2-3.5 |
| 2-2.8 |
| 2.5-3.5 |
| 2.6-3.3 |
| 2.8-3.5 |
| 2.9-3.3 |
| 3-3.5 |
| 2.8-3.2 |

Transverse rupture strength of sintered articles described herein is determined according to ASTM B406—Standard Test Method of Transverse Rupture Strength of Cemented Carbides. Sintered articles described herein can also have hardness of 500 to 3000 HV500 gf. HV500 gf refers to Vickers Hardness using a 500 gram-force load. The microhardness equipment is certified according to ASTM E 384—Standard Methods for Knoop and Vickers Hardness Materials. In some embodiments, for example, a sintered article has hardness of 700-1500 HV30.

In some embodiments, a sintered article produced according to methods described herein exhibits less than 25 percent shrinkage or less than 20 percent shrinkage in one or more dimensions relative to the green article. Linear shrinkage of the sintered article in one more dimensions relative to the green article can also have a value selected from Table VI.

TABLE VI

Linear Shrinkage of Sintered Article

≤15%
≤10%
≤5%
5-25%
5-10%
1-10%
1-5%

Sintered articles produced according to methods described herein can be employed in a variety of industries including petrochemical, automotive, aerospace, industrial tooling and manufacturing. In some embodiments, the sintered articles are used as components exposed to wear environments or abrasive operating conditions such as flow control components, pumps, bearings, valves, valve components, centrifuge components, disk stacks and/or fluid handling components. The sintered article can also comprise one or more internal fluid flow channels formed by the additive manufacturing technique. In some embodiments, sintered articles are near-net shape and/or require minimal post sintering processing to place the articles in final form. These and other embodiments are further illustrated by the following non-limiting examples.

Example 1

Powder Composition

A powder composition comprising sintered cemented carbide particles was prepared as follows. Tungsten carbide (WC) particles were milled with powder cobalt to produce a grade composition of comprising 83 weight percent WC and 17 weight percent cobalt (WC-17Co). Subsequent to milling, the WC-17Co grade was spray dried and sieved to a −53 μm to +10 μm distribution. The sieved grade powder was vacuum sintered ($<10^{-3}$ torr) in the solid state at 1150-1200° C. for 1-2 hours, forming a lightly sintered compact. The compact was milled by an impact mill to provide sintered cemented carbide particles. The sintered cemented carbide particles were re-sintered in vacuum ($<10^{-3}$ torr) in a partial liquid state at 1280-1350° C. for 1-2 hours, providing a porous sintered compact. The porous sintered compact was ball milled followed by impact milling to provide sintered cemented carbide particles having apparent density of 6.5 g/cm$^3$. Analysis by X-ray diffraction (XRD) confirmed the absence of non-stoichiometric carbides, including eta phase, in the sintered cemented carbide particles.

Example 2

Sintered Articles

Figure 2:
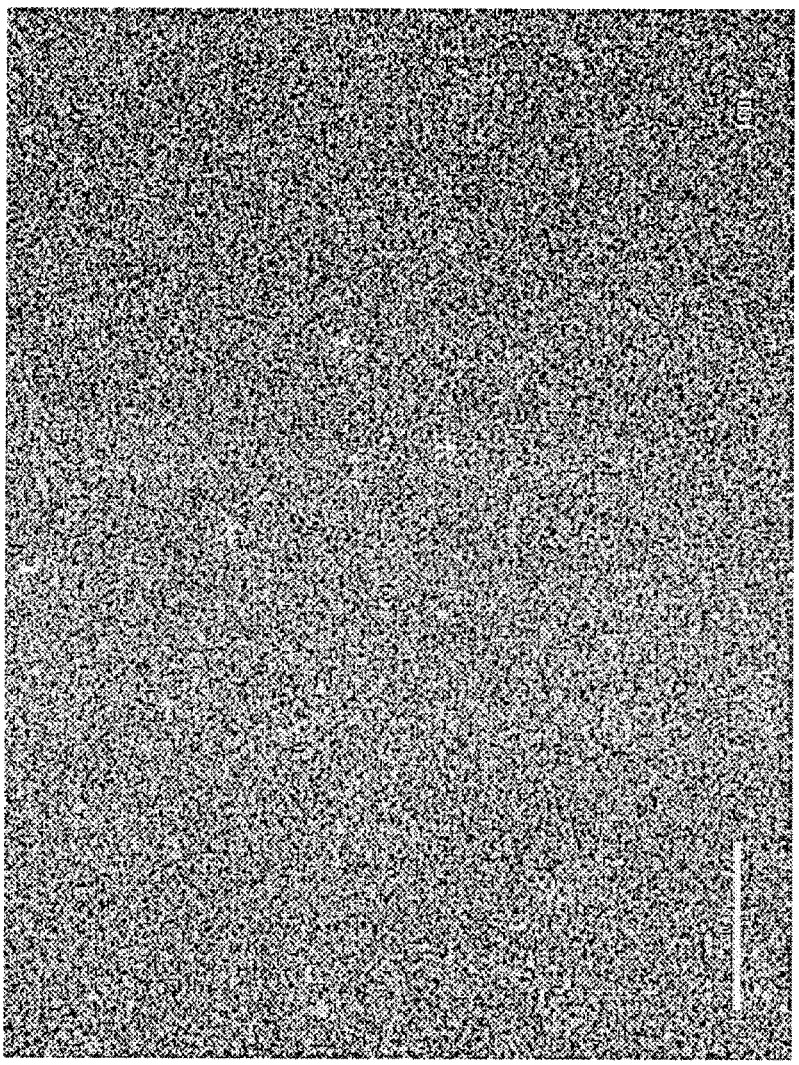
FIG. 2 is an SEM image illustrating the microstructure of a sintered article according to some embodiments described herein.

Sintered cemented carbide powder (WC-17% Co) of Example 1 was loaded into the chamber of a 3D printing system from ExOne of N. Huntingdon, Pa. The 3D printing system generated green transverse rupture bars in a layered process using iterative spreading of the WC-17% Co powder in a build box followed by application of PVP-PEG binder with poly glycol ether solvent according to the design of the rupture bar. A total of fifteen (15) green transverse rupture bars were fabricated by binder jetting of the sintered cemented carbide particles in the ExOne apparatus. The green bars were subsequently cured at 200° C. for 4 hours in air. The green transverse rupture bars exhibited good strength and handling characteristics. The green transverse rupture bars, for example, did not chip or flake and exhibited a compressive strength of at least 10 MPa according to ASTM E9. The green transverse rupture bars were vacuum sinter/HIP at 1460-1500° C. for 0.5-1 hour and densified to 13.7 g/cm$^3$ equaling 99.3% of theoretical density. The 15 sintered transverse rupture bars were then ground to dimension and tested according to ASTM B406. The average transverse rupture strength of the bars was 3044 MPa. Microstructural analysis revealed no eta phase and the absence of exaggerated large grains. FIG. 2 is an SEM of the microstructure of a sintered transverse rupture bar of the present example. As illustrated in FIG. 2, the microstructure is substantially uniform.

Example 3

Comparative Powder Composition and Sintered Article

Tungsten carbide (WC) particles were milled with powder cobalt to produce a grade composition of comprising 83 weight percent WC and 17 weight percent cobalt (WC-17Co). Subsequent to milling, the WC-17Co grade was spray dried and sieved to a −53 μm to +10 μm distribution. The sieved grade powder was vacuum sintered ($<10^{-3}$ torr) in the solid state at 1150-1200° C. for 1-2 hours, forming a lightly sintered compact. The compact was milled by an impact mill to provide sintered cemented carbide particles having apparent density of 4.5 g/cm$^3$.

This sintered cemented carbide powder was loaded into the chamber of ExOne 3D printing system. The 3D printing system generated a green transverse rupture bar in a layered process using iterative spreading of the powder composition in a build box followed by application of PVP-PEG binder with poly glycol ether solvent according to the design of the rupture bar. The green bar was cured in an oven at 200° C. for 4 hours. The green bar was fragile and chipped during handling. Compressive strength of the green bar could not be measured due to structural weakness of the green bar. The green bar was sintered in vacuum ($<10^{-3}$ torr) at 1460-1500° C. for 0.5-1 hour. The sintered transverse rupture bar was densified to 97% of theoretical density and exhibited a linear shrinkage of 31% in length relative to the green bar length.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:
1. A powder composition comprising:
a particle component comprising free flowing sintered cemented carbide particles having apparent density of at least 6 g/cm$^3$ to 11 g/cm$^3$ and a bimodal size distribution or multi-modal size distribution.
2. The powder composition of claim 1, wherein the apparent density of the free flowing sintered cemented carbide particles is 7 g/cm$^3$ to 11 g/cm$^3$.

3. The powder composition of claim 1, wherein the free flowing sintered cemented carbide particles have an average individual particle density of at least 80 percent theoretical density.

4. The powder composition of claim 1, wherein the free flowing sintered cemented carbide particles have an average individual particle density of at least 90 percent theoretical density.

5. The powder composition of claim 1, wherein the free flowing sintered cemented carbide particles have an average individual particle density of 80 to 95 percent theoretical density.

6. The powder composition of claim 1, wherein the free flowing sintered cemented carbide particles have an average size of 1 μm to 100 μm.

7. The powder composition of claim 6, wherein the free flowing sintered cemented carbide particles are spherical or substantially spherical.

8. The powder composition of claim 1, wherein the free flowing sintered cemented carbide particles comprise one or more metal carbides selected from the group consisting of Group IVB metal carbides, Group VB metal carbides and Group VIB metal carbides.

9. The powder composition of claim 8, wherein the free flowing sintered cemented carbide particles comprise tungsten carbide.

10. The powder composition of claim 9, wherein the free flowing sintered cemented carbide particles further comprise at least one Group VB metal carbide.

11. The powder composition of claim 9, wherein the free flowing sintered cemented carbide particles do not comprise non-stoichiometric metal carbides.

12. The powder composition of claim 11, wherein the non-stoichiometric metal carbides include eta phase.

13. The powder composition of claim 1, wherein the free flowing sintered cemented carbide particles comprise metallic binder in an amount of 0.1 to 35 weight percent.

14. The powder composition of claim 13, wherein the metallic binder is selected from the group consisting of cobalt, nickel, iron and alloys thereof.

15. The powder composition of claim 1, wherein the free flowing sintered cemented carbide particles have a ratio of tap density to the apparent density of 1.05 to 1.25.

16. The powder composition of claim 1, wherein the free flowing sintered cemented carbide particles have a bimodal size distribution.

17. The powder composition of claim 1, wherein the free flowing sintered cemented carbide particles have a multimodal size distribution.

18. The powder composition of claim 1, wherein the free flowing sintered cemented carbide particles comprise metallic binder comprising cobalt, nickel, iron, and alloys thereof.

19. The powder composition of claim 18, wherein the metallic binder further comprises an additive selected from the group consisting of platinum, palladium, rhenium, rhodium, ruthenium, molybdenum, and alloys thereof.

20. The powder composition of claim 1, wherein the free flowing sintered cemented carbide particles comprise a mixture of irregularly shaped particles with spherical or substantially spherical particles.

21. A powder composition comprising:
a particle component comprising free flowing sintered cemented carbide particles having apparent density of at least 6 g/cm$^3$ to 11 g/cm$^3$, the free flowing sintered cemented carbide particles comprising a mixture of irregularly shaped particles with spherical or substantially spherical particles.

\* \* \* \* \*